Oct. 18, 1927.
R. I. DENHAM
1,646,352
MEANS FOR MOUNTING VEHICLE WHEELS
Filed Jan. 25, 1927
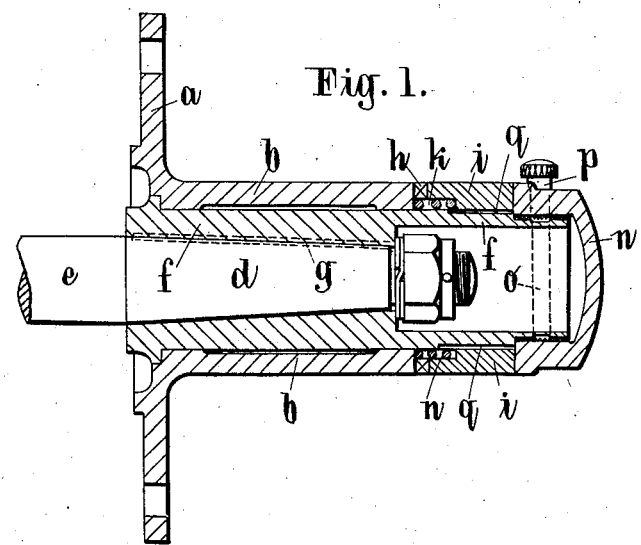
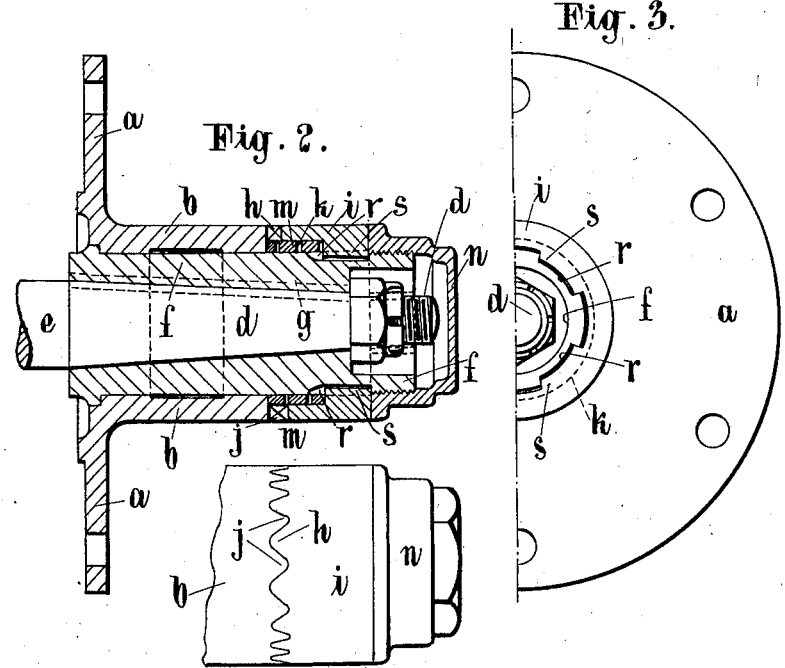
INVENTOR
Reginald I. Denham
BY
Wilkinson & Giusta
ATTORNEYS Patented Oct. 18, 1927.

1,646,352

UNITED STATES PATENT OFFICE.

REGINALD IVESON DENHAM, OF HAMPSTEAD, LONDON, ENGLAND.

MEANS FOR MOUNTING VEHICLE WHEELS.

Application filed January 25, 1927, Serial No. 163,480, and in Great Britain February 4, 1926.

This invention relates to an improvement in or modification of the device described in the specification of United States Letters Patent No. 1,536,778 for facilitating the starting of automobile engines. According to the present invention one of the rear road wheels of the vehicle is mounted loosely upon a sleeve fixed to the axle said sleeve extending beyond the end of the axle and supporting a collar the inner end of which is provided with angular teeth that mesh with similar teeth provided on the end of the wheel boss. An annular chamber is formed in the aforesaid collar within which is placed a helical spring that is compressed when the teeth are in engagement with one another.

The outer end of the sleeve is screw-threaded and provided with a hollow nut or cap which when screwed home retains the collar in engagement with the wheel boss and a groove may be provided in the screwed portion of the sleeve for accommodating a locking or grub screw that passes through from the exterior of the nut and secures the nut in the closed position. The external surface of the sleeve is provided with longitudinal serrations and corresponding serrations are formed on the interior surface of the collar to connect the same rotatably with the sleeve and permits longitudinal movement thereof away from the wheel boss on withdrawing the hollow nut aforesaid.

In order that the invention may be clearly understood reference may now be had to the accompanying sheet of drawings in which—

Figure 1 is a longitudinal sectional elevation of the device applied to the ordinary standard axle of a "Ford" car.

Figure 2 is a similar view of a modified construction.

Figure 3 is a fragmentary end view of Figure 2 with the cap removed and

Figure 4 a fragmentary elevation of Figure 2.

Referring now to the drawing in which similar reference characters relate to like parts in all the figures, instead of the hub flange $a$ carrying the boss $b$ on which the road wheel is mounted being secured to the tapered end $d$ of the axle $e$ it is loosely and rotatably mounted on the sleeve $f$ that is secured to the tapered end $d$ of the axle $e$ by the key $g$ or any other convenient manner.

The sleeve $f$ extends beyond the end of the axle $e$ and supports the collar $i$ the inner end of which is provided with angular teeth $h$ that mesh with similar teeth $j$ provided on the end of the wheel boss $b$. An annular chamber $k$ is formed in the collar $i$ within which is placed the helical spring $m$ that is compressed when the teeth $h$ and $j$ are in engagement with one another.

The outer end of the sleeve $f$ is screw-threaded and provided with a hollow nut or cap $n$ which when screwed home retains the collar $i$ in engagement with the wheel boss $b$ and the groove $o$ may be provided in the screwed portion of the sleeve $f$ for accommodating the locking or grub screw $p$ that passes through from the exterior and secures the nut $n$ in the closed position. The exterior surface of the sleeve $f$ is provided with longitudinal serrations $q$ and corresponding serrations are formed on the interior surface of the collar $i$ to connect the same rotatably with the sleeve $f$ but permits of longitudinal movement thereof away from the wheel boss $b$ when the hollow nut or cap $n$ is withdrawn.

The construction illustrated in Figures 2 to 4 is substantially the same as that illustrated in Figure 1 with the exception that instead of the serrations $q$ being provided on the internal surface of the collar $i$ and the exterior surface of the sleeve $f$ the screw-threaded end of the sleeve $f$ is provided with longitudinally disposed slots $r$ which accommodate projections $s$ formed on the interior surface of the collar $i$. This constructional detail is clearly shown in the fragmentary end view Figure 3.

It will now be understood that presuming the nut or cap $n$ be slackened back the collar $i$ will also recede laterally due to the pressure imparted thereto by the spring $m$ until the angular teeth $h$ and $j$ become disengaged, when the axle $e$ can be rotated without transmitting rotatory motion to the wheel mounted on the boss $b$, or in other words, a free wheel action of the axle is permissible.

What I claim is:—

1. In combination, a vehicle wheel hub provided with clutch teeth, an axle therefor with a tapered end, a sleeve fixed to said tapered end and rotatably carrying said wheel hub, a collar slidably mounted on said sleeve and provided with clutch teeth for engaging the clutch teeth on said wheel hub, a helical spring encircling said sleeve and disposed within an annular chamber in said collar, a cap screwed on the outer end of said sleeve and normally keeping said clutch elements in engagement, and means for securing said cap in its closed position.

2. In combination, a vehicle wheel hub provided with clutch teeth, an axle therefor with a tapered end, a sleeve fixed to said tapered end and rotatably carrying said wheel hub, a collar slidably mounted on said sleeve and provided with clutch teeth for engaging the clutch teeth on said wheel hub, means for ensuring a rotatable connection between said sleeve and said collar, a helical spring encircling said sleeve and disposed within an annular chamber in said collar, a cap screwed on the outer end of said sleeve and normally keeping said clutch elements in engagement, a groove on said outer end and a locking screw engaging said groove for securing said cap in the closed position.

In testimony whereof I affix my signature.

REGINALD IVESON DENHAM.